(12) United States Patent
Lu (10) Patent No.: US 11,837,913 B2
(45) Date of Patent: Dec. 5, 2023

(54) MULTIPLE-INPUT POWER SUPPLY AND CONTROL METHOD (71) Applicant: AA Power Inc., Boston, MA (US)

(72) Inventor: Qun Lu, Lexington, MA (US)

(73) Assignee: AA Power Inc., Boston, MA (US)

( * ) Notice: Subject to any disclaimer, the term of this patent is extended or adjusted under 35 U.S.C. 154(b) by 0 days.

(21) Appl. No.: 17/812,311

(22) Filed: Jul. 13, 2022

(65) Prior Publication Data
US 2023/0028283 A1 Jan. 26, 2023

Related U.S. Application Data (60) Provisional application No. 63/223,670, filed on Jul. 20, 2021.

(51) Int. Cl.
H02J 9/06 (2006.01)
H02M 1/42 (2007.01)
H02M 7/217 (2006.01)

(52) U.S. Cl.
CPC .......... H02J 9/061 (2013.01); H02M 1/4208 (2013.01); H02M 7/217 (2013.01)

(58) Field of Classification Search
CPC ...... H02J 9/061; H02M 1/4208; H02M 7/217; H02M 1/0067; H02M 1/0083; H02M 1/4258; H02M 1/0064; Y02B 70/10
USPC .......................................................... 307/64
See application file for complete search history.

(56) References Cited

U.S. PATENT DOCUMENTS

| | | | |
|---|---|---|---|
| 8,963,371 B2 * | 2/2015 | Kinnard | H02J 9/061 307/64 |
| 2004/0004402 A1 * | 1/2004 | Kippley | H02J 1/10 307/82 |
| 2017/0170733 A1 * | 6/2017 | Ferencz | H02J 9/061 |
| 2020/0412237 A1 * | 12/2020 | Dai | H02J 7/02 |

* cited by examiner

Primary Examiner — Rexford N Barnie
Assistant Examiner — Xuan Ly
(74) Attorney, Agent, or Firm — AP3 Law Firm PLLC (57) ABSTRACT A dual-input power conversion system includes a first primary side power network coupled between a first ac power source and a first primary winding of a transformer, a second primary side power network coupled between a second ac power source and a second primary winding the transformer, a secondary side power network coupled to a secondary side of the transformer, and a power converter coupled between the secondary side power network and a load.

6 Claims, 6 Drawing Sheets

MULTIPLE-INPUT POWER SUPPLY AND CONTROL METHOD

PRIORITY

This application claims the benefit of U.S. Provisional Application No. 63/223,670, filed on Jul. 20, 2021, entitled "Dual-Input Redundant AC/DC Power Supply for Information Technology Equipment in a Data Center," which application is hereby incorporated herein by reference.

TECHNICAL FIELD

The present invention relates to a multiple-input power supply and control method, and, in particular embodiments, to a dual-input power supply for efficiently supplying power for information technology (IT) power applications.

BACKGROUND

As technologies further advance, a variety of Internet based information processing services, such as media streaming, cloud computing and/or the like, have become popular. The Internet based information processing services require sharing information over networks. The information sharing over the networks demands a plurality of data centers for collecting, storing, processing, and distributing a large amount of data used in the information processing services.

A data center is a facility (e.g., one building) configured to house a large number of computer servers and associated components. The large number of computer servers are configured to process and respond to information service requests (e.g., multimedia streaming) from various users connected to the data center through the Internet.

Data center power is an essential element in designing and operating efficient and reliable data centers. Most data centers obtain their primary electricity from the electric grid. To ensure that the data centers operate in a smooth and reliable manner at all times, redundant or backup power supplies are employed to provide a steady supply of clean, uninterrupted electricity. For example, a data center may be connected to the electric grid through two independent power paths (e.g., two independent power substations). Furthermore, at least one fuel generator is connected to the data center. The fuel generator functions as a backup power supply. Once the power from the electric grid is interrupted, the fuel generator is activated to supply electrical power to the data center. Due to the long startup time of the fuel generator, there is a time delay for the fuel generator to deliver full power. In order to keep the data center operating continuously and without interruption, at least one Uninterruptible Power Supply (UPS) is connected to the data center. The UPS includes batteries that can provide instantaneous power upon loss of the electric grid power.

In order to achieve reliable IT power, IT equipment with redundant power supplies (e.g., dual power supplies) is a common practice for reliably operating critical loads. For example, a power conversion system of the data center is coupled between the power sources (e.g., ac power from the electric grid) and the load (e.g., the servers in the data center). The power sources may be implemented as two power supplies. A first power supply is connected to a first ac power source. A second power supply is connected to a second ac power source. These two ac power sources are independent from each other. This power conversion system provides two power delivery paths from the two ac power sources to the load (e.g., servers). As a result, the power conversion system is able to achieve input redundancy. A switch may be employed to select which power delivery path is used to deliver power from the ac power sources to the load. The switch can be implemented as a high-voltage switch whose contacts are opened and closed in oil. Alternatively, the switch can be implemented as a mechanical relay.

In operation, if one ac power source is interrupted, the switch is able to switch the power delivery from the failed power delivery path to the other delivery path. The two most common switches described above are mechanical switches. The mechanical switches are not able to achieve rapid switching. As a result, the power conversion system has to have a large hold-up capacitor so that the power can be sustained continuously when a fault occurs. It would be desirable to have a reliable, cost-effective and long life power conversion system to supply power to the data center continuously in various operating conditions.

SUMMARY

These and other problems are generally solved or circumvented, and technical advantages are generally achieved, by preferred embodiments of the present disclosure which provide a multiple-input power supply and control method.

In accordance with an embodiment, a power conversion system comprises a first primary side power network coupled between a first ac power source and a first primary winding of a transformer, a second primary side power network coupled between a second ac power source and a second primary winding the transformer, a secondary side power network coupled to a secondary side of the transformer, and a power converter coupled between the secondary side power network and a load.

In accordance with another embodiment, a method comprises providing a dual-input power conversion system comprising a first isolated power factor correction device coupled between a first ac power source and a hold-up capacitor, and a second power factor correction device coupled between a second ac power source and the hold-up capacitor, detecting whether both the first ac power source and the second ac power source are available, and in response to two available ac power sources, disabling one of the first isolated power factor correction device and the second isolated power factor correction device.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a dual-input power conversion system and control method. The disclosure may also be applied, however, to a variety of power conversion systems. Hereinafter, various embodiments will be explained in detail with reference to the accompanying drawings.

Figure 1:
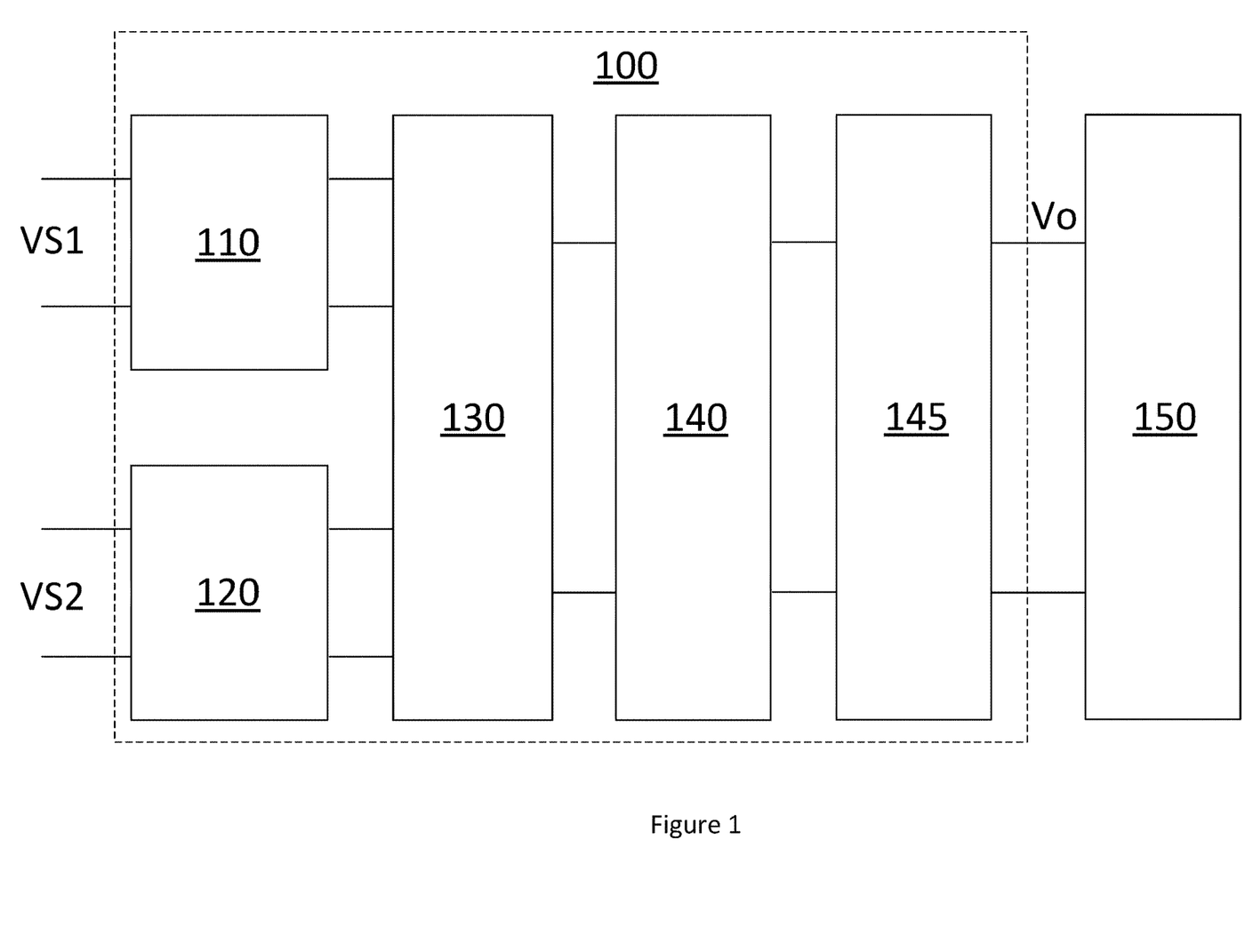
FIG. 1 illustrates a block diagram of a dual-input power conversion system in accordance with various embodiments of the present disclosure.

FIG. 1 illustrates a block diagram of a dual-input power conversion system in accordance with various embodiments of the present disclosure. The dual-input power conversion system 100 comprises a first primary side power network 110, a second primary side power network 120, a magnetic coupling apparatus 130, a secondary side power network 140 and a power converter 145. As shown in FIG. 1, the inputs of the first primary side power network 110 are coupled to a first ac power source VS1. The outputs of the first primary side power network 110 are coupled to a primary side of the magnetic coupling apparatus 130. The inputs of the second primary side power network 120 are coupled to a second ac power source VS2. The outputs of the second primary side power network 120 are coupled to the primary side of the magnetic coupling apparatus 130. The secondary side of the magnetic coupling apparatus 130 is coupled to the power converter 145 through the secondary side power network 140. The output of the power converter 145 is connected to a load 150.

In some embodiments, the load 150 is the IT equipment in a data center. The first ac power source VS1 and the second ac power source VS2 are independent from each other. For example, VS1 is generated from a first power substation of the electric grid. VS2 is generated from a second power substation of the electric grid. Alternatively, VS1 and VS2 are from a same source of the electric grid. The power delivery path from the source to VS1 is different from the power delivery path from the source to VS2. It should be noted that the dual-input power conversion system 100 is not coupled to VS1 and VS2 directly. Some power conversion elements such as rectifiers and filters may be coupled between the ac power sources VS1, VS2 and the dual-input power conversion system 100.

In some embodiments, the magnetic coupling apparatus 130 is implemented as a transformer. Throughout the description, the magnetic coupling apparatus 130 may be alternatively referred to a transformer. In some embodiments, the transformer 130 has two primary windings and one secondary wining. A first primary winding is connected to the first primary side power network 110. A second primary winding is connected to the second primary side power network 120. A secondary winding is connected to the secondary side power network 140.

In some embodiments, the first primary side power network 110, the first primary winding of the transformer 130 and the secondary side power network 140 form a first power factor correction device. The first power factor correction device is of a forward topology, a fly-forward topology, a flyback topology, any combinations thereof and the like. The second primary side power network 120, the second primary winding of the transformer 130 and the secondary side power network 140 form a second power factor correction device. The second power factor correction device is of a forward topology, a fly-forward topology, a flyback topology, any combinations thereof and the like.

In some embodiments, the first power factor correction device and the second power factor correction device share the transformer 130. In other words, the first power factor correction device and the second power factor correction device are magnetically coupled to each other.

The secondary side power network 140 may comprises a rectifier and a filter. The rectifier converts an alternating polarity waveform received from the transformer 130 to a single polarity waveform. The rectifier may be formed of one pair of switching elements such as n-type metal oxide semiconductor (NMOS) transistors. Alternatively, the rectifier may be formed of one pair of diodes. The filter is employed to produce a steady and smooth output voltage at the output Vo of the dual-input power conversion system 100.

The power converter 145 may be implemented as an isolated dc/dc converter such as a forward converter, a flying converter, a fly-forward converter, a full bridge converter, a half bridge converter, an LLC resonant converter, any combinations thereof and the like. Alternatively, the power converter 145 may be implemented as a non-isolated dc/dc converter such as a buck converter, a boost converter, a buck-boost converter, any combinations thereof and the like.

In operation, a system controller (not shown) is configured to determine whether both ac sources VS1 and VS2 are available. Once both ac sources are available, the system controller disables one power factor correction device (e.g., the first power factor correction device in 110) and enables the other power factor correction device (e.g., the second power factor correction device in 120). The first power factor correction device and the second power factor correction device share a hold-up capacitor. The hold-up capacitor is on the secondary side and across the two terminals of the output of the secondary side power network 140. When a fault occurs in the second power source VS2, the hold-up capacitor provides power to the load 150 through the power converter 145. In response to the fault in the second power source VS2, the second power factor correction device is disabled, and the first power factor correction device is enabled. After the first power factor correction device has been enabled, the first power source VS1 is able to provide power to the load 150.

One advantageous feature of having the dual-input power conversion system 100 shown in FIG. 1 is that the dual-input power conversion system 100 is able to have a fast transition in response to a system fault.

Figure 2:
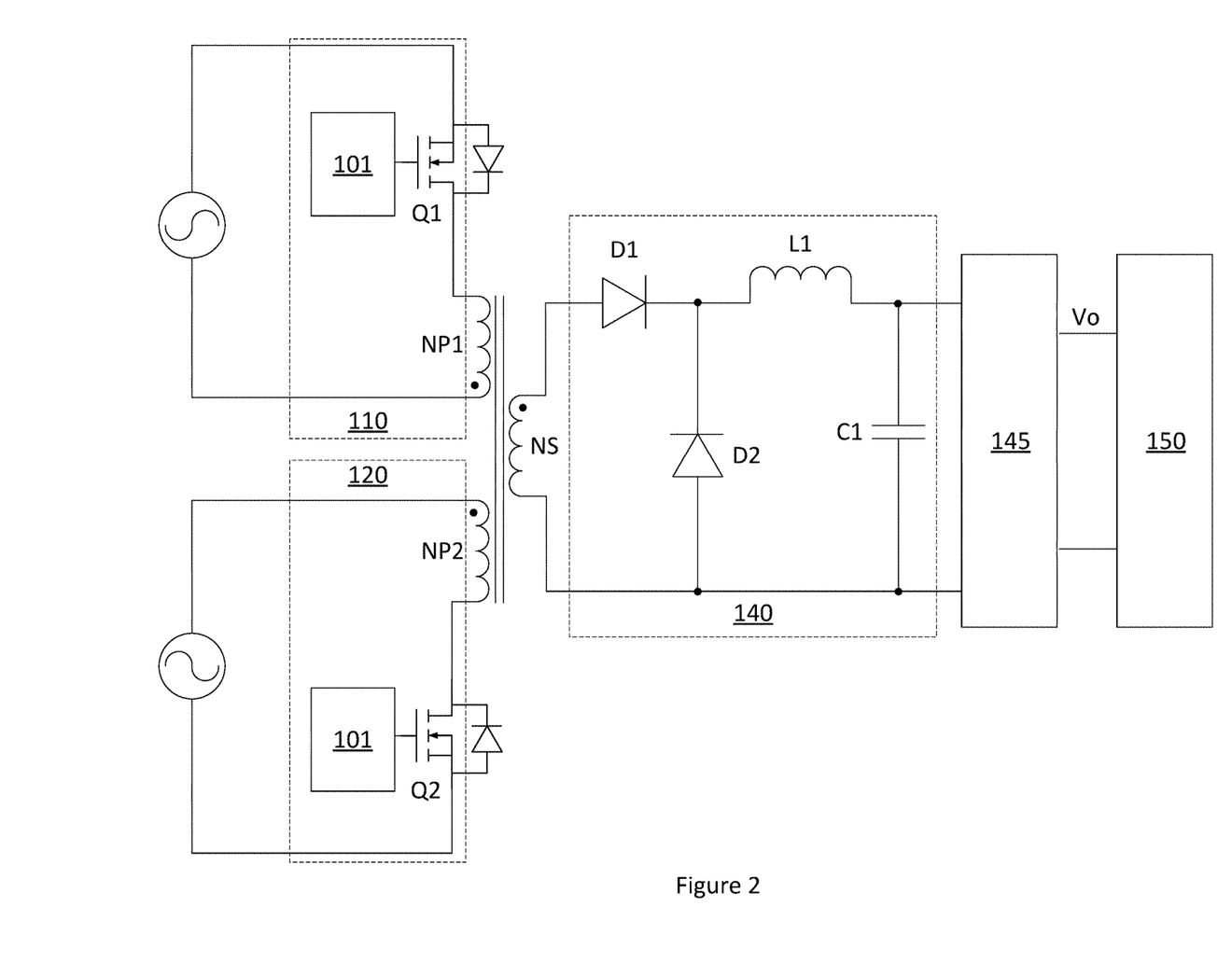
FIG. 2 illustrates a schematic diagram of a first implementation of the dual-input power conversion system shown in FIG. 1 in accordance with various embodiments of the present disclosure.

FIG. 2 illustrates a schematic diagram of a first implementation of the dual-input power conversion system shown in FIG. 1 in accordance with various embodiments of the present disclosure. The dual-input power conversion system has two inputs coupled to a first ac power source VS1 and a second ac power source VS2, respectively. As shown in FIG. 2, the dual-input power conversion system comprises a first primary side power network 110, a second primary side power network 120, a transformer comprising windings NP1, NP2, NS, a secondary side power network 140 and a power converter 145.

The first primary side power network 110 comprises a first switch Q1 connected in series with the first primary winding NP1 of the transformer. The second primary side power network 120 comprises a second switch Q2 connected in series with the second primary winding NP2 of the transformer. The secondary side power network 140 is coupled between a secondary side of the transformer and a load 150 through the power converter 145. In particular, the secondary side power network 140 comprises a rectifier and a filter connected in cascade between the secondary side of the transformer and the power converter 145. The output capacitor C1 is part of the filter. In addition, C1 functions as a hold-up capacitor for the dual-input power conversion system. Throughout the description, C1 is alternatively referred to as a hold-up capacitor.

In some embodiments, the hold-up capacitor C1 is implemented as an electrolytic capacitor, a plurality of electrolytic capacitors connected in parallel, a plurality of electrolytic capacitors connected in series, any combinations thereof and the like. In alternative embodiments, the hold-up capacitor C1 may be implemented as other suitable capacitors such as ceramic capacitors, polymer capacitors, any combinations thereof and the like.

As shown in FIG. 2, Q1 and NP1 form a primary side circuit of a first forward converter. D1, D2, L1 and C1 form a secondary side circuit of the first forward converter. The first forward converter is configured to operate as a first power factor correction stage of the dual-input power conversion system. Likewise, Q2 and NP2 form a primary side circuit of a second forward converter. D1, D2, L1 and C1 form a secondary side circuit of the second forward converter. The second forward converter is configured to operate as a second power factor correction stage of the dual-input power conversion system. The transformer and the secondary side circuit formed by D1, D2, L1 and C1 are shared by these two forward converters.

A controller 101 is configured to generate gate drive signals for the first switch Q1 and the second switch Q2. In some embodiments, the controller 101 is a power management integrated circuit. Alternatively, the controller 101 may be a microcontroller, a digital signal processor (DSP) and the like.

The power converter 145 is configured to covert the voltage across the hold-up capacitor C1 into a voltage suitable for the load 150 connected at the output Vo of the dual-input power conversion system.

It should be noted the primary side circuit (e.g., Q1 and NP1) of the first forward converter shown in FIG. 2 is merely an example, which should not unduly limit the scope of the claims. One of ordinary skill in the art would recognize many variations, alternatives, and modifications. For example, depending on different applications and design needs, other relevant circuits such as an active clamp may be included to achieve better efficiency.

The secondary side power network 140 comprises a rectifier and a filter connected in cascade between the secondary side of the transformer and the load. As shown in FIG. 2, the rectifier comprises a first rectifier diode D1 and a second rectifier diode D2. The filter comprises an output inductor L1 and the output capacitor C1. As shown in FIG. 2, an anode of the first rectifier diode D1 is connected to a first terminal of a secondary winding NS of the transformer. An anode of the second rectifier diode D2 is connected to a second terminal of the secondary winding NS of the transformer. A cathode of the first rectifier diode D1 and a cathode of the second rectifier diode D2 are connected together and further connected to a first terminal of the output inductor L1. A second terminal of the output inductor L1 is connected to a first terminal of the output capacitor C1. A second terminal of the output capacitor C1 is connected to the second terminal of the secondary winding NS of the transformer.

In some embodiments, Q1 of the first primary side power network 110, Q2 of the second primary side power network 120, the transformer and the secondary side power network 140 form two power factor correction devices with a forward topology. In operation, one of the power factor correction device (e.g., the second power factor correction device formed by Q2) may be disabled in response to two available ac power sources. The enabled power factor correction device (e.g., the first power factor correction device formed by Q1) is configured to provide power to the load 150.

It should be noted that the diagram shown in FIG. 2 is merely an example, which should not unduly limit the scope of the claims. One of ordinary skill in the art would recognize many variations, alternatives, and modifications. For example, the first power converter may be implemented as any other suitable power factor correction devices. Furthermore, both D1 and D2 may be replaced by high efficiency switching elements.

In accordance with an embodiment, the switches of FIG. 2 (e.g., switches Q1-Q2) may be metal oxide semiconductor field-effect transistor (MOSFET) devices, bipolar junction transistor (BJT) devices, super junction transistor (SJT) devices, insulated gate bipolar transistor (IGBT) devices, gallium nitride (GaN) based power devices and/or the like.

It should be noted while FIG. 2 shows the switches Q1-Q2 are implemented as single n-type transistors, a person skilled in the art would recognize there may be many variations, modifications and alternatives. For example, depending on different applications and design needs, at least some of the switches may be implemented as p-type transistors. Furthermore, each switch shown in FIG. 2 may be implemented as a plurality of switches connected in parallel. Moreover, a capacitor may be connected in parallel with one switch to achieve zero voltage switching (ZVS)/zero current switching (ZCS).

In operation, a system controller (not shown) is configured to determine whether both ac power sources are available. Once both ac power sources are available, the system controller turns off the switch (e.g., Q1) of one power factor correction device and maintains the normal operation of the switch (e.g., Q2) of the other power factor device.

In operation, there may be two ways to disable one of the power converters. In some embodiments, during the startup process of the dual-input power conversion system, both power factor correction devices are configured to operate concurrently. The voltage across C1 is established during the startup process. The bias voltage of the system controller is also established during the startup process. The bias voltage may be generated from the voltage across C1. Once the bias voltage has been established, the system controller detects whether both ac power sources are available. Once both ac power sources are available, the system controller may disable one power factor correction device. In alternative embodiments, before the two power factor correction devices are enabled, the bias voltage of the system controller is generated by a dedicated bias power supply (e.g., an ac/dc converter). Once the bias voltage has been established, the system controller detects whether both ac power sources are available. Once both ac power sources are available, the system controller may only enable one power factor correction device.

Figure 3:
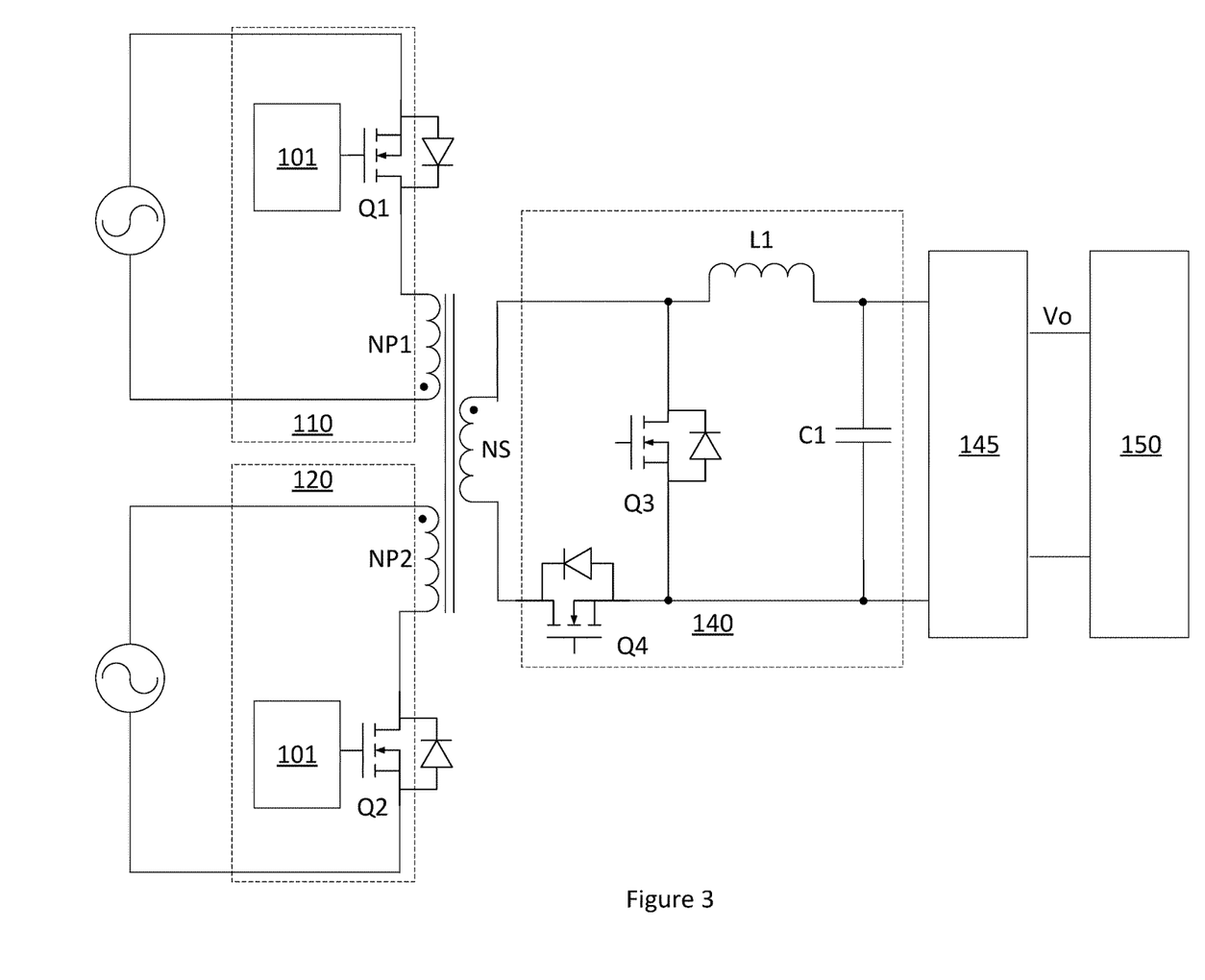
FIG. 3 illustrates a schematic diagram of a second implementation of the dual-input power conversion system shown in FIG. 1 in accordance with various embodiments of the present disclosure.
Figure 5:
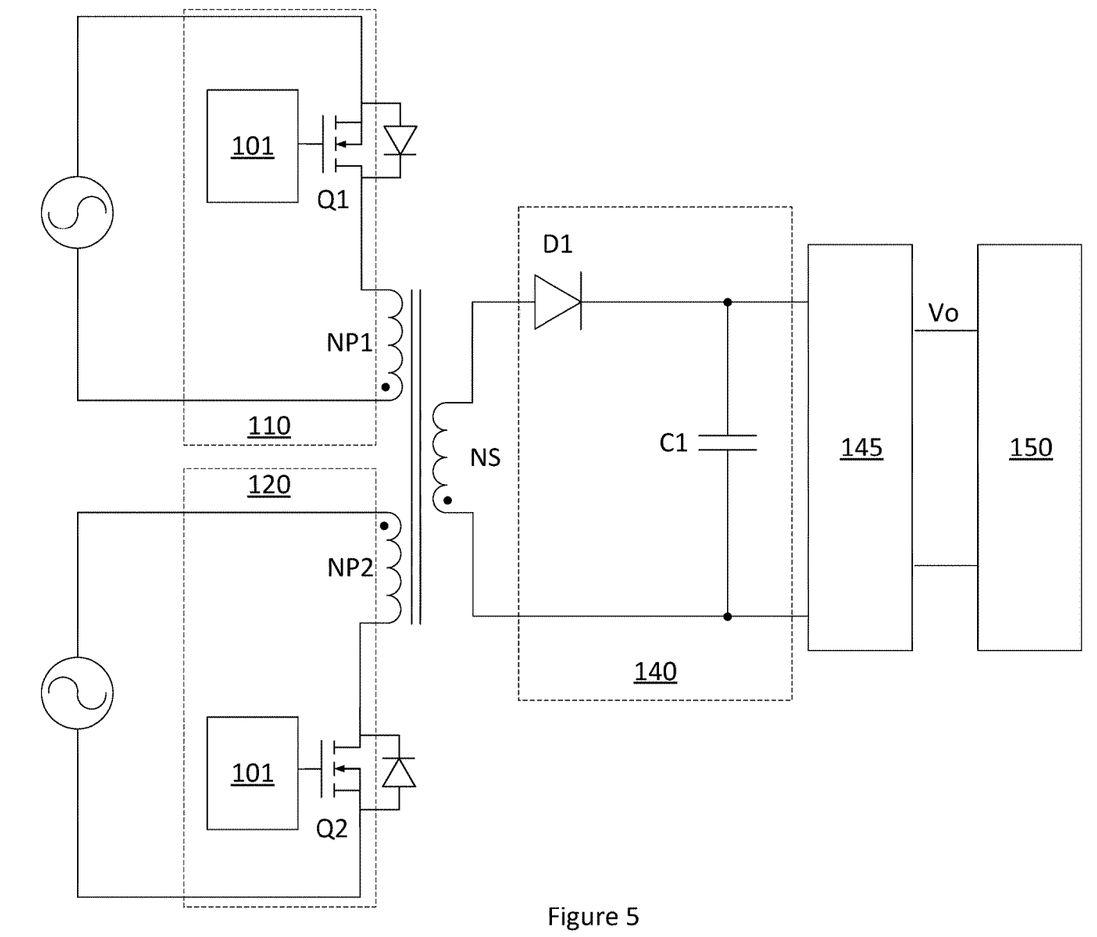
FIG. 5 illustrates a schematic diagram of a fourth implementation of the dual-input power conversion system shown in FIG. 1 in accordance with various embodiments of the present disclosure.

FIG. 3 illustrates a schematic diagram of a second implementation of the dual-input power conversion system shown in FIG. 1 in accordance with various embodiments of the present disclosure. The second implementation of the dual-input power conversion system shown in FIG. 3 is similar to the first implementation of the dual-input power conversion system shown in FIG. 2 except that the first rectifier diodes and the second rectifier diode are replaced by two rectifier switches, respectively. It should be noted that replacement shown in FIG. 5 is merely an example. A person skilled in the art would understand there are many variations. For example, the first rectifier diodes and the second rectifier diode are replaced by two MOSFET switches, a combination of MOSEFT switches and diodes, any combinations thereof and the like.

As shown in FIG. 3, the rectifier comprises a first rectifier switch Q3 and a second rectifier switch Q4. The filter comprises an output inductor L1 and an output capacitor C1. A drain of the first rectifier switch Q3 is connected to a first terminal of a secondary winding NS of the transformer. A drain of the second rectifier switch Q4 is connected to a second terminal of the secondary winding NS of the transformer. A source of the first rectifier switch Q3 and a source of the second rectifier switch Q4 are connected together and further connected to a second terminal of the output capacitor C1. A first terminal of the output inductor L1 is connected to the first terminal of the secondary winding NS of the transformer. A first terminal of the output capacitor C1 is connected to a second terminal of the output inductor L1.

In some embodiments, Q1 of the first primary side power network 110, Q2 of the second primary side power network 120, the transformer, Q3, Q4 of the secondary side power network 140 and the filter form two power factor correction devices with a forward topology. The operating principle of this forward topology has been described above with respect to FIG. 2, and hence is not discussed again herein.

Figure 4:
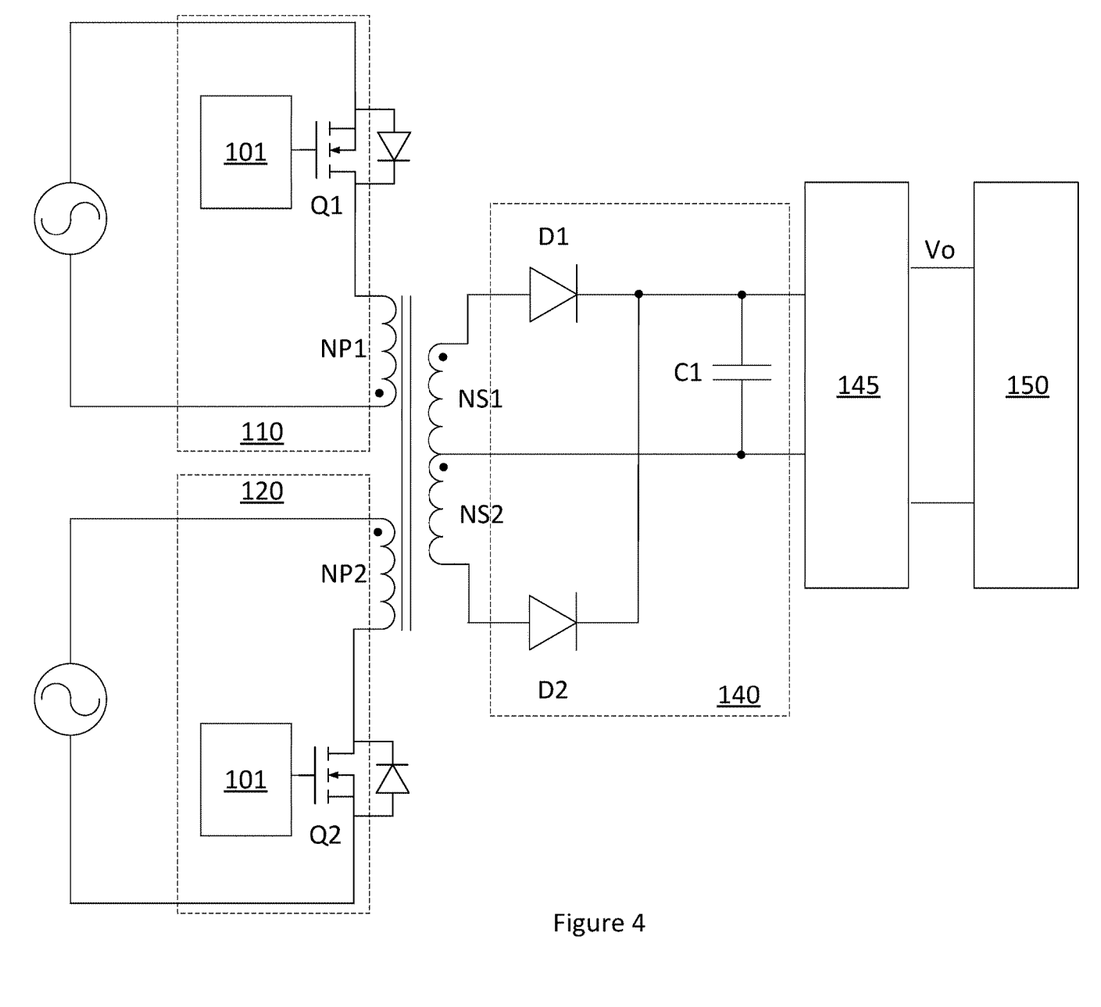
FIG. 4 illustrates a schematic diagram of a third implementation of the dual-input power conversion system shown in FIG. 1 in accordance with various embodiments of the present disclosure.

FIG. 4 illustrates a schematic diagram of a third implementation of the dual-input power conversion system shown in FIG. 1 in accordance with various embodiments of the present disclosure. The third implementation of the dual-input power conversion system shown in FIG. 4 is similar to the first implementation of the dual-input power conversion system shown in FIG. 2 except that the forward topology shown in FIG. 2 is replaced by a fly-forward topology.

As shown in FIG. 4, the rectifier comprises a first rectifier diode D1 and a second rectifier diode D2. The filter comprises an output capacitor C1. An anode of the first rectifier diode D1 is connected to a first terminal of a first secondary winding NS1 of the transformer. An anode of the second rectifier diode D2 is connected to a second terminal of a second secondary winding NS2 of the transformer. A cathode of the first rectifier diode D1 and a cathode of the second rectifier diode D2 are connected together and further connected to a first terminal of the output capacitor C1. A second terminal of the first secondary winding NS1 of the transformer is connected to a first terminal of the second secondary winding NS2 of the transformer and further connected to a second terminal of the output capacitor C1.

In some embodiments, Q1 of the first primary side power network 110, Q2 of the second primary side power network 120, the transformer, D1 and D2 of the secondary side power network 140 and the filter form two power factor correction devices with the fly-forward topology.

It should be noted that depending on different applications and design needs, the first rectifier diode D1 and a second rectifier diode D2 may be replaced by switching elements. For example, the rectifier diode D1 may be replaced by a MOSFET, a plurality of MOSFETs connected in parallel and the like.

FIG. 5 illustrates a schematic diagram of a fourth implementation of the dual-input power conversion system shown in FIG. 1 in accordance with various embodiments of the present disclosure. The fourth implementation of the dual-input power conversion system shown in FIG. 5 is similar to the first implementation of the dual-input power conversion system shown in FIG. 2 except that the forward topology shown in FIG. 2 is replaced by a flyback topology.

As shown in FIG. 5, the rectifier comprises a rectifier diode D1. The filter comprises an output capacitor C1. An anode of the rectifier diode D1 is connected to a first terminal of a secondary winding NS of the transformer. A cathode of the rectifier diode D1 is connected to a first terminal of the output capacitor C1. A second terminal of the output capacitor C1 is connected to a second terminal of the secondary winding NS of the transformer.

In some embodiments, Q1 of the first primary side power network 110, Q2 of the second primary side power network 120, the transformer, D1 of the secondary side power network 140 and the filter form two power factor correction devices with the flyback topology.

It should be noted that depending on different applications and design needs, the rectifier diode D1 may be replaced by a switching element. For example, the rectifier diode D1 may be replaced by a MOSFET, a plurality of MOSFETs connected in parallel and the like.

Figure 6:
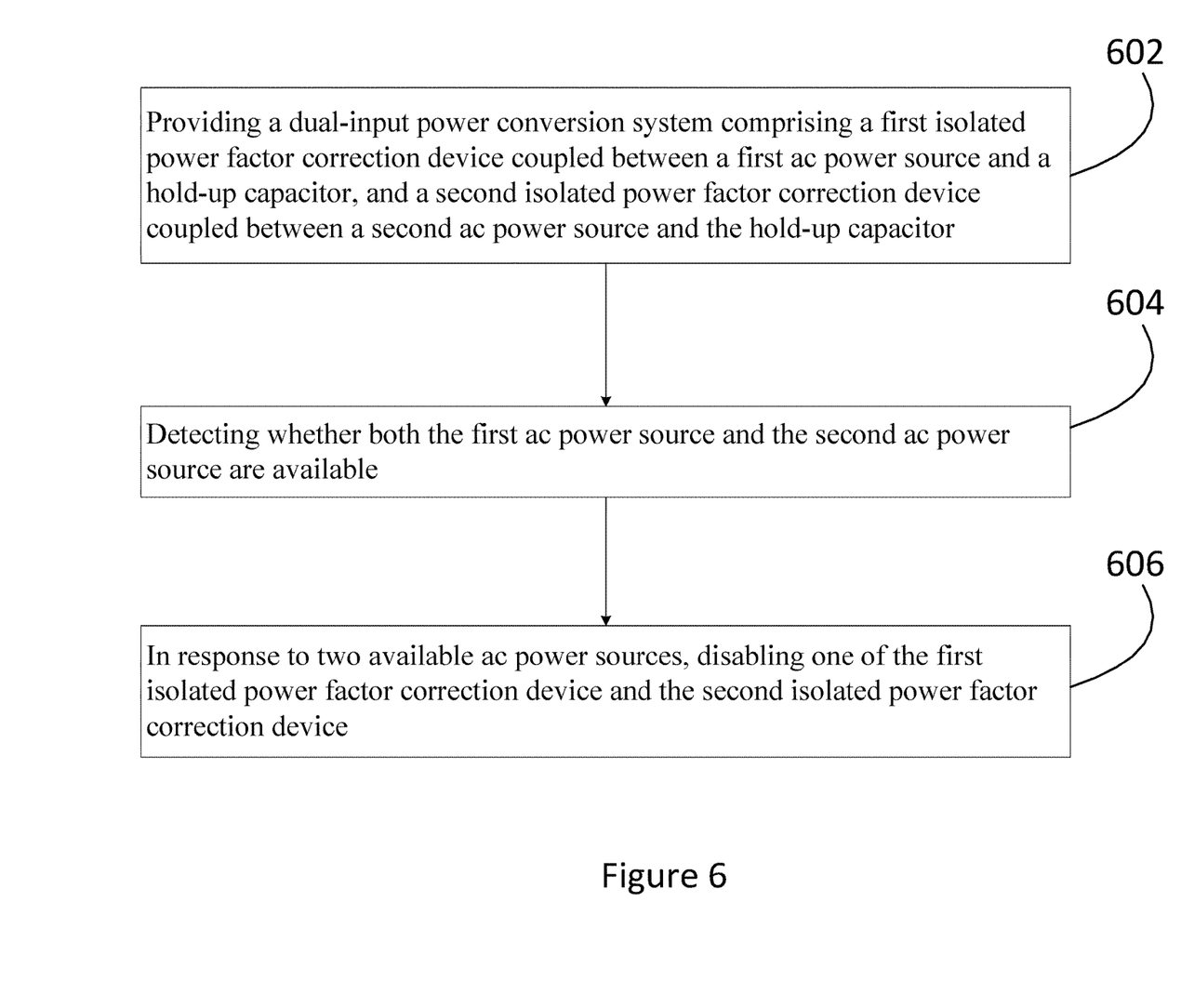
FIG. 6 illustrates a flow chart of controlling the dual-input power conversion system shown in FIG. 1 in accordance with various embodiments of the present disclosure.

FIG. 6 illustrates a flow chart of controlling the dual-input power conversion system shown in FIG. 1 in accordance with various embodiments of the present disclosure. This flowchart shown in FIG. 6 is merely an example, which should not unduly limit the scope of the claims. One of ordinary skill in the art would recognize many variations, alternatives, and modifications. For example, various steps illustrated in FIG. 6 may be added, removed, replaced, rearranged and repeated.

Referring back to FIG. 1, a dual-input power conversion system comprises a first primary side power network (e.g., first primary side power network 110 shown in FIG. 1), a second primary side power network (e.g., second primary side power network 120 shown in FIG. 1), a transformer (e.g., transformer 130 shown in FIG. 1), a secondary side power network (e.g., secondary side power network 140 shown in FIG. 1) and a power converter (e.g., power converter 145 shown in FIG. 1).

The first primary side power network comprises a first switch (e.g., Q1 shown in FIG. 2) coupled between the first ac power source (e.g., VS1 shown in FIG. 2) and a first primary winding (e.g., NP1 shown in FIG. 2) of the transformer.

The second primary side power network comprises a second switch (e.g., Q2 shown in FIG. 2) coupled between the second ac power source (e.g., VS2 shown in FIG. 2) and a second primary winding (e.g., NP2 shown in FIG. 2) of the transformer. VS1 and VS2 are from two independent ac power sources. Alternatively, VS1 and VS2 are from a same ac power source, but having two different power delivery paths.

The secondary side power network (e.g., D1, D2, L1 and C1 shown in FIG. 2) is coupled between a secondary side of the transformer and a power converter (e.g., power converter 145 shown in FIG. 2). The output of the power converter is connected to a load.

At step 602, a dual-input power conversion system is provided. The dual-input power conversion system has two inputs coupled to a first ac power source and a second ac power source, respectively.

The dual-input power conversion system comprises a first isolated power factor correction device coupled between a first ac power source and a hold-up capacitor, and a second isolated power factor correction device coupled between a second ac power source and the hold-up capacitor.

At step 604, a system controller detects whether both the first ac power source and the second ac power source are available.

At step 606, in response to two available ac power sources, the system controller disables one of the first isolated power factor correction device and the second isolated power factor correction device.

The method further comprises during a startup process of the dual-input power conversion system, enabling both the first isolated power factor correction device and the second isolated power factor correction device to establish a voltage across the hold-up capacitor, establishing a bias voltage based on the voltage across the hold-up capacitor, and detecting whether both the first ac power source and the second ac power source available once the bias voltage has been established.

The method further comprises during a startup process of the dual-input power conversion system, establishing a bias voltage using an independent ac/dc power converter, detecting whether both the first ac power source and the second ac power source available once the bias voltage has been established, and enabling one of the first isolated power factor correction device and the second isolated power factor correction device to establish a voltage across the hold-up capacitor.

The method further comprises in response to the two available ac power sources, disabling the second isolated power factor correction device, and configuring the first ac power source to provide power to a load connected to the dual-input power conversion system, and in response to a fault occurred in the first ac power source, disabling the first isolated power factor correction device, configuring the hold-up capacitor to provide power to the load, and enabling the second isolated power factor correction device to replenish the hold-up capacitor, and provide power to the load.

The method further comprises providing a dc/dc converter coupled between the hold-up capacitor and a load connected to the dual-input power conversion system, wherein the dc/dc converter is configured to regulate a voltage applied to the load.

The method further comprises configuring the first isolated power factor correction device and the second isolated power factor correction device to form an isolated power factor correction unit with a forward topology.

The method further comprises configuring the first isolated power factor correction device and the second isolated power factor correction device to form an isolated power factor correction unit with a fly-forward topology.

The method further comprises configuring the first isolated power factor correction device and the second isolated power factor correction device to form an isolated power factor correction unit with a fly-forward topology.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A power conversion system comprising:
a first primary side power network coupled between a first ac power source and a first primary winding of a transformer;
a second primary side power network coupled between a second ac power source and a second primary winding the transformer;
a secondary side power network coupled to a secondary side of the transformer, wherein the secondary side power network comprises a rectifier and a filter connected in cascade between the secondary side of the transformer and the power converter, and wherein the rectifier comprises a first rectifier switch and a second rectifier switch, and the filter comprises an output inductor and an output capacitor, and wherein:
a drain of the first rectifier switch is connected to a first terminal of a secondary winding of the transformer;
a drain of the second rectifier switch is connected to a second terminal of the secondary winding of the transformer;
a source of the first rectifier switch and a source of the second rectifier switch are connected together and further connected to a second terminal of the output capacitor;
a first terminal of the output inductor is connected to the first terminal of the secondary winding of the transformer; and a first terminal of the output capacitor is connected to a second terminal of the output inductor, and wherein the first primary side power network, the second primary side power network, the transformer and the secondary side power network form an isolated power factor correction device with a forward topology; and a power converter coupled between the secondary side power network and a load.

2. The power conversion system of claim 1, wherein:
the first primary side power network comprises a first switch connected in series with the first primary winding of the transformer; and
the second primary side power network comprises a second switch connected in series with the second primary winding of the transformer.

3. The power conversion system of claim 2, wherein:
the first switch and the second switch are controlled by a same controller; and
the first switch and the second switch are configured to be turned on and off in a sync manner.

4. The power conversion system of claim 2, wherein:
the first switch, the first primary winding of the transformer and the secondary side power network form a first power factor correction device; and
the second switch, the second primary winding of the transformer and the secondary side power network form a second power factor correction device.

5. The power conversion system of claim 2, wherein:
once both the first ac power source and the second ac power source are available, at least one of the first switch and the second switch is disabled.

6. The power conversion system of claim 1, wherein:
the power converter is a non-isolated dc/dc converter.

* * * * *